(12) United States Patent
Kienzle et al.

(10) Patent No.: US 10,487,792 B2
(45) Date of Patent: Nov. 26, 2019

(54) IGNITION COIL AND METHOD FOR OPERATING

(71) Applicant: BorgWarner Ludwigsburg GmbH, Ludwigsburg (DE)

(72) Inventors: Dejan Kienzle, Heilbronn (DE); Dirk Wüstenhagen, Auma (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 65 days.

(21) Appl. No.: 15/911,534

(22) Filed: Mar. 5, 2018

(65) Prior Publication Data
US 2018/0258902 A1    Sep. 13, 2018

(30) Foreign Application Priority Data

Mar. 9, 2017    (DE) .................. 10 2017 104 953

(51) Int. Cl.
| | |
|---|---|
| F02P 3/04 | (2006.01) |
| H04B 3/54 | (2006.01) |
| F02P 5/145 | (2006.01) |
| F02P 11/06 | (2006.01) |
| F02P 17/00 | (2006.01) |
| F02D 41/22 | (2006.01) |
| F02P 17/12 | (2006.01) |

(52) U.S. Cl.
CPC .......... F02P 3/0407 (2013.01); F02P 5/1455 (2013.01); F02P 11/06 (2013.01); F02P 17/00 (2013.01); H04B 3/548 (2013.01); F02D 41/22 (2013.01); F02P 2017/121 (2013.01)

(58) Field of Classification Search
CPC ........ F02P 3/0407; F02P 3/0453; F02P 3/051; F02P 3/053; F02P 3/0552; F02P 5/1455; F02P 11/06; F02P 17/00; F02P 17/02; F02P 17/12; F02P 2017/121; F02D 41/22; H04B 3/548

See application file for complete search history.

(56) References Cited

U.S. PATENT DOCUMENTS

| | | | |
|---|---|---|---|
| 5,054,461 A | * | 10/1991 | Deutsch ................ F02P 3/0456 123/609 |
| 6,766,243 B1 | | 7/2004 | Haussmann et al. |
| 2008/0006242 A1 | | 1/2008 | Kagleder |

FOREIGN PATENT DOCUMENTS

| | | |
|---|---|---|
| DE | 199 56 381 A1 | 4/2001 |
| DE | 10 2005 009 981 A1 | 9/2006 |

* cited by examiner

*Primary Examiner* — Hung Q Nguyen
*Assistant Examiner* — Mark L. Greene
(74) *Attorney, Agent, or Firm* — Bose McKinney & Evans LLP

(57) ABSTRACT

A method for operating an ignition coil is described, wherein a secondary voltage pulse is generated by feeding a primary voltage pulse into a transformer of the ignition coil, and a primary current, a primary voltage, a secondary current and/or a secondary voltage are measured, wherein the course of the primary current, the primary voltage, the secondary voltage and/or the secondary current are monitored and, when a malfunction is determined during subsequent primary voltage pulse, an error signal is generated which indicates that a malfunction has occurred during the previous primary voltage pulse and classifies the malfunction. In addition, a corresponding ignition coil is described.

10 Claims, 3 Drawing Sheets

IGNITION COIL AND METHOD FOR OPERATING

RELATED APPLICATIONS

This application claims priority to DE 10 2017 104 953.3, filed Mar. 9, 2017, the entire disclosure of which is hereby incorporated herein by reference.

BACKGROUND AND SUMMARY

This disclosure relates to an ignition coil and a method for operating an ignition coil.

Ignition coils contain a transformer, with which a secondary voltage pulse for a spark plug is generated by feeding a primary voltage pulse. Usually, ignition coils also contain a control and monitoring unit that controls the transformer. The control and monitoring unit is usually connected to an engine control unit with which it communicates during operation. Ignition coils usually have a signal input and a signal output for this purpose.

This disclosure teaches how important operating information can be made available to an engine control unit with as little effort as possible during the operation of an ignition coil.

According to this disclosure, the primary current, the primary voltage, the secondary current and/or the secondary voltage are measured and monitored during operation of an ignition coil. If a malfunction is detected, an error signal is generated during a subsequent primary voltage pulse, the error signal indicating that a malfunction has occurred during the previous primary voltage pulse and classifying the malfunction. A malfunction can be determined by evaluating the course of the primary voltage, the secondary voltage, the primary current and/or the secondary current. For example, a malfunction can be detected by finding a deviation of the course of the primary current or the primary voltage or the secondary current or the secondary voltage from of an expected course or course range.

According to this disclosure, a possible malfunction to an engine control unit is therefore not reported in the same operating cycle of the ignition coil in which it occurs. Instead, the malfunction is communicated to the engine control unit only in the next operating cycle of the ignition coil, i.e., during the next primary voltage pulse. The monitoring can be simplified and realized with little hardware expense in this way.

The error signal may be a pulse, for example, a current pulse or a voltage pulse. The malfunction can be classified in this case, for example, by the duration of the pulse, its timing or its intensity, i.e., at a voltage pulse of its voltage level. The error signal can also be a pulse sequence, the pattern of which classifies the malfunction, that is to say is associated with a type of error or a combination of several errors.

The duration of the error signal can be used to classify the malfunction that has been ascertained by evaluating the course of the primary voltage or the secondary voltage. Possible malfunctions that can be classified are, for example, too long an activation of the coil, which is also referred to as overdwell, too rapid a decay of the secondary current, for example, due to a sliding discharge, too long a stopping of the secondary current, which for example can occur if the ignition voltage is too low or there is a short circuit, too high a temperature, or the occurrence of several of the above error cases at the same time. Thus, essential information about the error that has occurred can be transmitted by the error signal to the engine control unit without the need for additional transmission channels or data lines.

A further advantageous refinement of this disclosure provides that the error signal is generated on the same signal output on which a monitoring signal pulse is generated at least during some primary voltage pulses. The monitoring signal pulse is started as soon as the primary current reaches a first predetermined threshold value, and is terminated as soon as the primary current reaches a second predetermined threshold value that is greater than the first predetermined threshold. Thus, the signal output or the signal line connected to it can not only be used for transmitting an error signal, but also to communicate important information about the operation of the ignition coil to the engine control unit during regular operation, namely the speed at which the primary current increases. This information is important for the engine control unit in order to be able to precisely specify the desired ignition timing.

The monitoring signal pulse may be generated independently of the error signal, such that both an error signal and a monitoring signal pulse are generated during a primary voltage pulse. The error signal may then be sent before or after the monitoring signal pulse, sent both before and after the monitoring signal pulse, or even be integrated into the monitoring signal pulse, for example, its amount.

However, the monitoring signal pulse is preferably only generated if no malfunction has been determined during the preceding primary voltage pulse. When a malfunction occurs, such a monitoring signal pulse which communicates to the engine control unit how fast the primary current is increasing, is less significant. Therefore, upon occurrence of a malfunction in the subsequent cycle of the ignition coil, such a monitoring signal pulse can be dispensed with in favor of an error signal.

To facilitate distinguishing monitoring signal pulses and error signals, the error signal is preferably started and terminated before the primary current reaches the first threshold value. An error signal then occurs essentially earlier in the operating cycle of the ignition coil than a monitoring signal pulse. The engine control unit can thus recognize these different pulses by how early or how late they occur in an operating cycle of the ignition coil. Alternatively or additionally, error signals and monitoring signal pulses can basically also be distinguished on the basis of the pulse duration, since the time duration in which the primary current increases from the first predetermined threshold value to the second predetermined threshold value is not precisely known to the engine control unit, but this time period always lies in a defined and known range.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
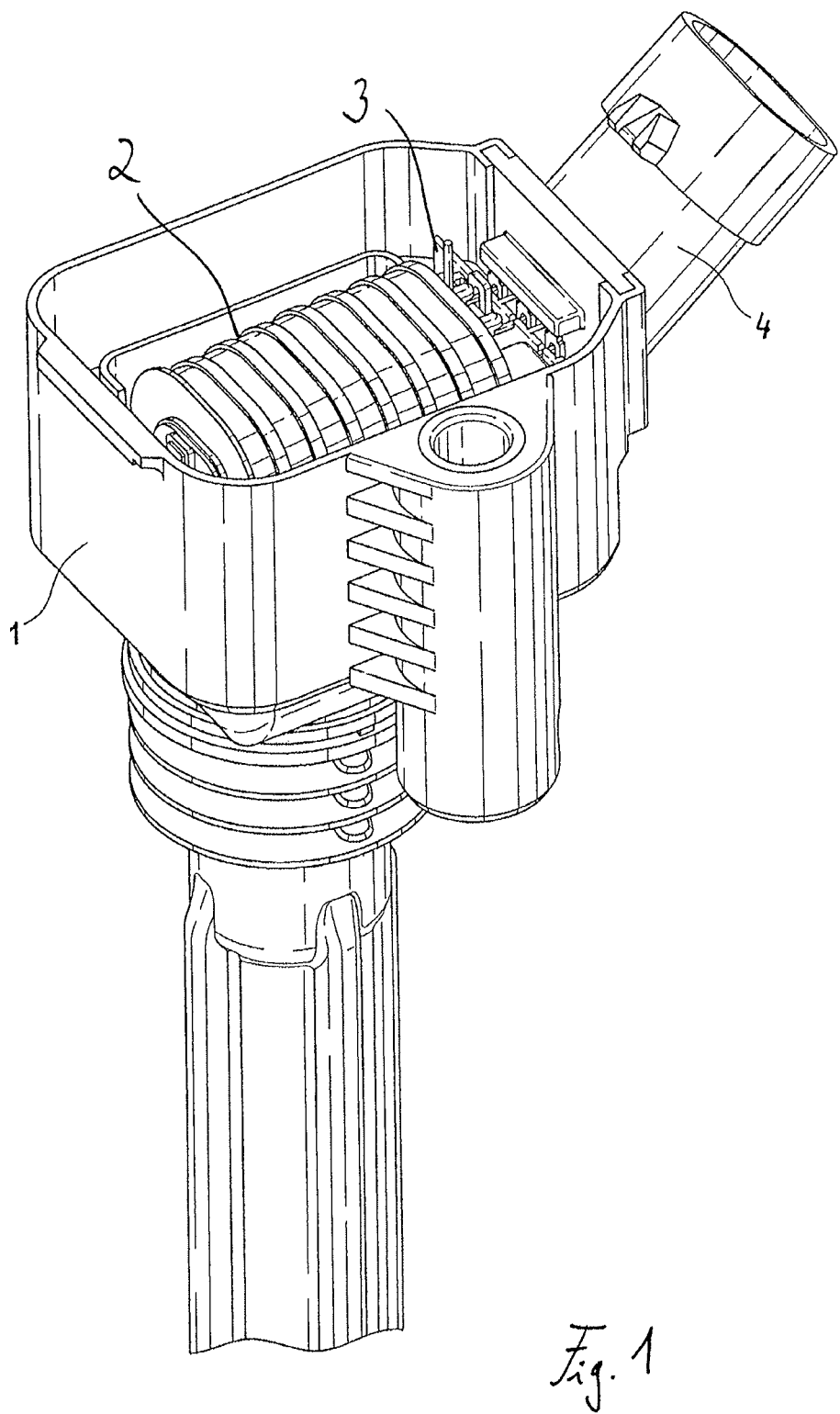
FIG. 1 is a schematic view of an ignition coil with opened housing.

FIG. 1 schematically shows an ignition coil when the housing 1 is open. A transformer 2 is arranged in the housing, the transformer being controlled by a control and monitoring unit 3. In the embodiment shown, the control and monitoring unit 3 is configured as a circuit board with a circuit arranged thereon, which sits in the housing. The housing 1 carries a connector 4, via which the ignition coil can be electrically connected to a primary voltage source, for example the electrical system of a vehicle. The connector 4 may additionally form a signal input with one of its contacts and a signal output with another contact. Signal input and signal output can also be provided at another location on the housing in order to be connected with a separate connector to an engine control unit.

A secondary voltage pulse for an ignition coil is generated by feeding a primary voltage pulse into the transformer 2 of the ignition coil. The control and monitoring unit 3 of the ignition coil monitors the course of primary current and secondary current or primary voltage and secondary voltage with suitable sensors.

Figure 2:
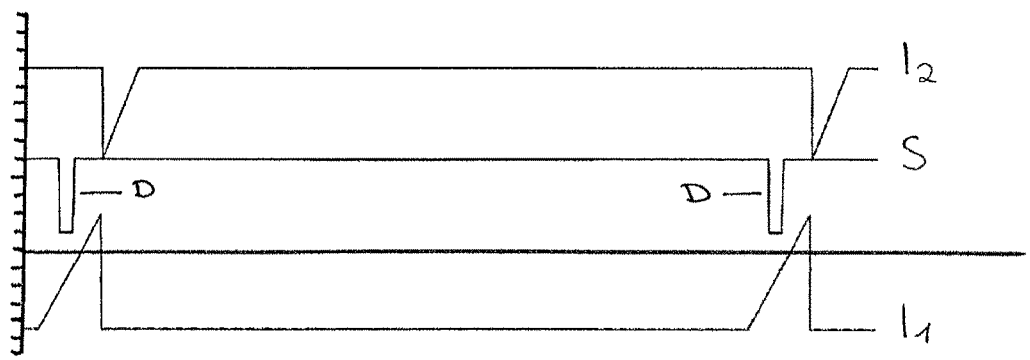
FIG. 2 schematically shows the course of primary and secondary current as well as the potential on the signal output with error-free operation of the ignition coil.

In FIG. 2, the course of the primary current $I_1$ and of the secondary current $I_2$ are shown schematically for an error-free operation of the ignition coil. In addition, the potential on the potential output S of the ignition coil is shown. In FIG. 2, the respective signal curve is plotted for two operating cycles of the ignition coil. At the beginning of a working pulse, a primary voltage pulse is fed into the transformer of the ignition coil. This primary voltage pulse causes a corresponding primary current pulse, as shown in FIG. 2. The primary current pulse is followed immediately by a secondary current pulse $I_2$, which is delivered to a spark plug which is connected to the ignition coil. The increase of the primary current $I_1$ is important for a precise control of the ignition timing. Therefore, a diagnostic signal pulse D is generated on the signal output S, which begins as soon as the primary current $I_1$ has reached a first predetermined threshold value, for example 3 A, and is terminated as soon as the primary current $I_1$ has reached a second threshold value, for example 6 A.

The width of such a diagnostic signal pulse D on the signal output of the ignition coil thus indicates to an engine control unit the rate of increase of the primary current $I_1$.

Figure 3:
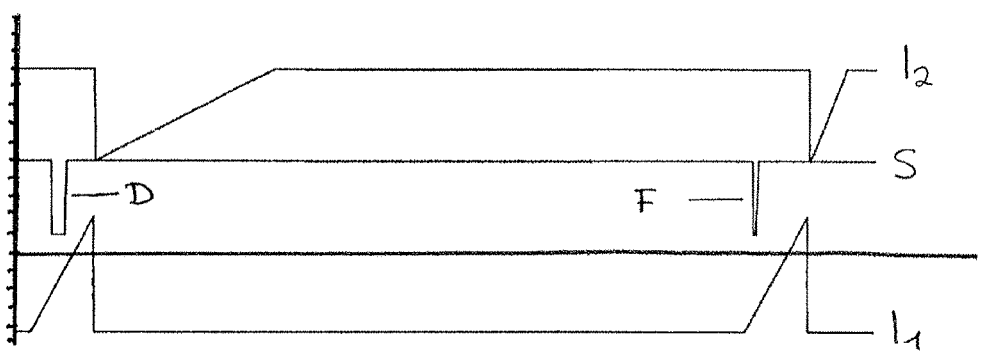
FIG. 3 schematically shows the course of the primary current and the potential on the signal output for a faulty and a subsequent operating cycle of the ignition coil.

FIG. 3 shows in FIG. 2 corresponding representations the course of primary current $I_1$ and secondary current $I_2$ over two operating cycles of the ignition coil, wherein a malfunction occurs in the first operating cycle. The malfunction appears in the course of the secondary current $I_2$ in that it decays too slowly, so even after a predetermined period of time, it is still located above a predetermined threshold. This indicates that no spark has formed. In the subsequent operating cycle of the ignition coil, therefore, an error signal F is generated on the signal output S, for example, in the form of a voltage pulse or current pulse. The diagnostic signal pulse generated in the previous faulty operating cycle is omitted.

The error signal F is substantially shorter than a diagnostic signal pulse D and can already be reliably distinguished from a diagnostic signal pulse D. In addition, the error signal F is already generated at an earlier time in the operating cycle of the ignition coil, in particular, the error signal F is already terminated when the primary current $I_1$ reaches the first threshold value.

Figure 4:
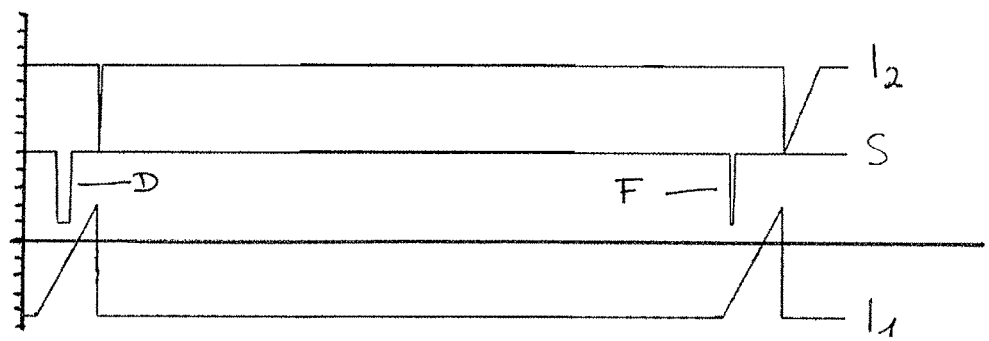
FIG. 4 schematically shows the course of the primary current and the potential on the signal output for a further example of a faulty and a subsequent operating cycle of the ignition coil.

FIG. 4 shows, by way of example, the signal courses in the event of a further error. In the case of an error of FIG. 4, the secondary current $I_2$ decays much too quickly after the first primary voltage pulse, for example, because no spark has formed as a result of a sliding discharge. In the subsequent primary voltage pulse $I_1$, an error signal F is therefore generated and the diagnostic signal pulse D is omitted.

Figure 5:
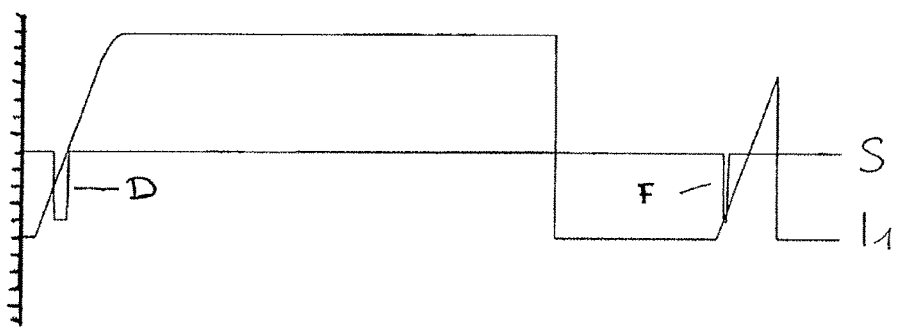
FIG. 5 schematically shows the course of the primary current and the potential on the signal output for a further example of a faulty and a subsequent operating cycle of the ignition coil.

Another example of an error is shown schematically in FIG. 5. In this error, the primary voltage pulse is much too long and the primary current $I_1$ therefore remains very high for too long, which can happen, for example, by too long an activation of the transformer of the ignition coil. In this case, the diagnostic signal pulse D is omitted in the subsequent primary voltage pulse and instead an error signal F is generated.

The error cases explained in the preceding figures can be indicated by different length error signals to the engine control unit, for example, different length pulses or pulse sequences. Differences in the pulse length of 20 µs can be detected reliably, so that even relatively small differences in the pulse length are sufficient to provide error signal pulses with a different length depending on the error. For example, a minimum pulse length of the error signal pulse in the range of 200 µs to 300 µs can be selected and the cause of error can be coded by pulse length differences of 20 µs or more.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A method for operating an ignition coil, comprising:
   feeding a first primary voltage pulse into a transformer of the ignition coil and thereby generating a secondary voltage pulse;
   measuring a primary current, a primary voltage, a secondary current and/or a secondary voltage;
   monitoring the course of the primary current, the primary voltage, the secondary voltage and/or the secondary current; and
   when a malfunction is determined from the monitoring, generating an error signal during a subsequent primary voltage pulse, wherein the error signal indicates that the malfunction occurred during the first primary voltage pulse and the error signal classifies the malfunction.

2. The method according to claim 1, wherein the classifying of the malfunction is a function of the duration of the error signal.

3. The method according to claim 1, wherein the error signal is generated at a signal output at which a monitoring signal pulse is generated at least during some primary voltage pulses, the monitoring signal pulse being started as soon as the primary current reaches a first predetermined threshold value, and the monitoring signal pulse being terminated as soon as the primary current reaches a second predetermined threshold value that is greater than the first predetermined threshold value.

4. The method according to claim 3, wherein the error signal is started and terminated before the primary current reaches the first threshold value.

5. The method according to claim 1, wherein the beginning of the error signal is triggered by an increase of the primary voltage to a predetermined value.

6. The method according to claim 1, wherein the error signal is a pulse.

7. An ignition coil, comprising:
a transformer having a primary side and a secondary side;
a signal output; and
a controller having circuitry and sensors, the controller configured to:
control the transformer and feed a first primary voltage pulse into the primary side of the transformer to generate a secondary voltage pulse for a spark plug;
monitor the course of a primary current, a primary voltage, a secondary voltage and/or a secondary current to detect a malfunction;
in response to the detection of the malfunction, generate during a subsequent primary voltage pulse, an error signal on the signal output, the error signal indicating that the malfunction has occurred during the first primary voltage pulse; and
classify the malfunction.

8. The ignition coil according to claim 7, wherein the classifying of the malfunction is a function of the duration of the error signal.

9. The ignition coil according to claim 7, wherein the controller is configured to generate a monitoring signal pulse on the signal output at least during some primary voltage pulses, which is started as soon as the primary current reaches a first predetermined threshold value, and the monitoring signal pulse is terminated as soon as the primary current reaches a second predetermined threshold value, which is greater than the first predetermined threshold value.

10. The ignition coil according to claim 7, wherein the controller only generates the monitoring signal pulse if no malfunction has been determined during the first primary voltage pulse.

* * * * *